United States Patent

King, Jr. et al.

[15] 3,677,066
[45] July 18, 1972

[54] METHOD FOR PRECONDITIONING PIEZOELECTRIC SORPTION DETECTORS

[72] Inventors: William H. King, Jr., Florham Park; Walter A. Dietz, Westfield, both of N.J.

[73] Assignee: Esso Research and Engineering Company

[22] Filed: July 31, 1970

[21] Appl. No.: 59,988

Related U.S. Application Data

[63] Continuation-in-part of Ser. No. 798,089, Feb. 10, 1969, abandoned.

[52] U.S. Cl....................................................73/23, 73/23.1
[51] Int. Cl..........................................................G01n 29/02
[58] Field of Search................73/23, 23.1; 55/67, 197, 386, 55/387; 23/232 C

[56] References Cited

UNITED STATES PATENTS 2,985,007  5/1961  Boeke.....................................73/23.1
3,111,025  11/1963  Ayers......................................73/23.1
3,374,659  3/1968  Sanford...................................73/23.1

OTHER PUBLICATIONS

Eggertsen et al., " Gas Chromatography– Use of Liquid–Modified Solid Adsorbent to Resolve $C^5$ and $C^6$ Saturates," Analytical Chemistry, Vol. 28, No. 3, March 1956, pp 303– 306.

Primary Examiner—Richard C. Queisser
Assistant Examiner—C. E. Snee, III
Attorney—Manahan and Wohlers and J. J. Dvorak

[57] ABSTRACT

Highly sensitive sorption detectors are prepared from colloidal dispersions of high surface area porous materials. These sensitive sorption detectors are preconditioned by exposure to certain specified liquids. Preconditioning stabilizes the output signal of the detector making them particularly useful in measuring trace components in gas streams.

11 Claims, 7 Drawing Figures

PRECONDITIONING SILICA GEL DETECTOR
SORBENT COLUMN AT 100°C
DETECTOR AT 25°C
DETECTING THIOPHANE PEAK

APPARATUS FOR THIOPHANE ANALYSIS ON LPG

PRECONDITIONING SILICA GEL DETECTOR
SORBENT COLUMN AT 100°C
DETECTOR AT 25°C
DETECTING THIOPHANE PEAK

TRACE OF THIOPHANE IN PROPANE

William H. King Jr. Inventors
Walter A. Dietz

LINEARITY OF OSCILLATING CRYSTAL FOR THOPHANE 3,677,066

METHOD FOR PRECONDITIONING PIEZOELECTRIC SORPTION DETECTORS

CROSS REFERENCES

This application is a continuation-in-part of U.S. Ser. No. 798,089, filed Feb. 10, 1969, now abandoned.

BACKGROUND OF THE INVENTION

This invention relates to coated crystal detectors. More specifically, this invention is concerned with a method for stabilizing the output signal of highly sensitive sorption detectors used in measuring low concentrations of impurities in gas streams. Even more specifically, this invention relates to a method for preconditioning highly sensitive piezoelectric detectors so that the sensitivity of the detector is constant.

Piezoelectric and magnetostrictive materials coated with a substrate which interacts preferentially with a particular substance are of great importance in industry. Such materials have applicability, for example, in simple analyzers used to detect and measure various substances typically present in petroleum gas streams.

For example, liquified petroleum gas and natural gas are normally odorless. As a safety precaution these gases when used commercially are odorized. An exceptionally effective odorant is thiophane, which is a cyclic sulfide compound having a high odor impact on the human nose. Due to its marked odor characteristic, thiophane is used in very low concentrations. Thus, concentrations of less than one part thiophane per million are commonly employed.

These low concentrations create problems of monitoring and measuring the thiophane content. In the past, various gas chromatography methods and techniques were used to make concentration measurements of gas mixture streams. However, the prior art methods employing these techniques, are not capable of measuring concentrations of thiophane in the order of 10 parts per billion, which is a commonly used commercial concentration.

Prior art methods of gas chromatography, of which the flame ionization detector method and the thermal conductivity detector method are examples, can be used to separate thiophane from hydrocarbon components in liquefied petroleum gas only when thiophane is present in relatively large concentrations of at least 10 parts per million.

As stated previously, piezoelectric and magnetostrictive materials have applicability in detecting and measuring substances generally present in petroleum gas streams. For determining low concentrations of impurities such as sulfur compounds in gas mixtures, however, it is essential that the detector be very sensitive to the trace species and relatively insensitive to major gaseous components so that small concentrations of the trace species are readily detectable. Additionally, the sensitivity of detector to the trace component must be substantially constant. The present invention is concerned with piezoelectric and magnetostrictive detectors which meet this need.

SUMMARY OF THE INVENTION

According to the present invention, there is provided a method of preparing a piezoelectric detector of constant sensitivity which is particularly useful in selectively detecting and measuring trace components in hydrocarbon gas streams.

In brief, any material which exhibits piezoelectric properties is coated with a high surface area material which reacts preferentially with the trace material to be detected and which is relatively insensitive to the major components in the gas stream. Next, the coated crystal is preconditioned, to provide a constant sensitivity, by exposing the detector to a high boiling polar liquid.

In a preferred embodiment, a quartz crystal is coated with silica having a surface area of about 135 to 430 square meters per gram. The silica coated crystal is then exposed to high boiling oxygenated solvents for a time sufficient to render the sensitivity of the detector constant.

BRIEF DESCRIPTION OF THE DRAWINGS

The invention may be better understood by reference to the accompanying drawings in which.

DETAILED DESCRIPTION

The invention will be more readily understood by reference to the detection and measurement of a sulfur containing hydrocarbon in a petroleum gas stream, the details of which are set forth below.

Figure 1:
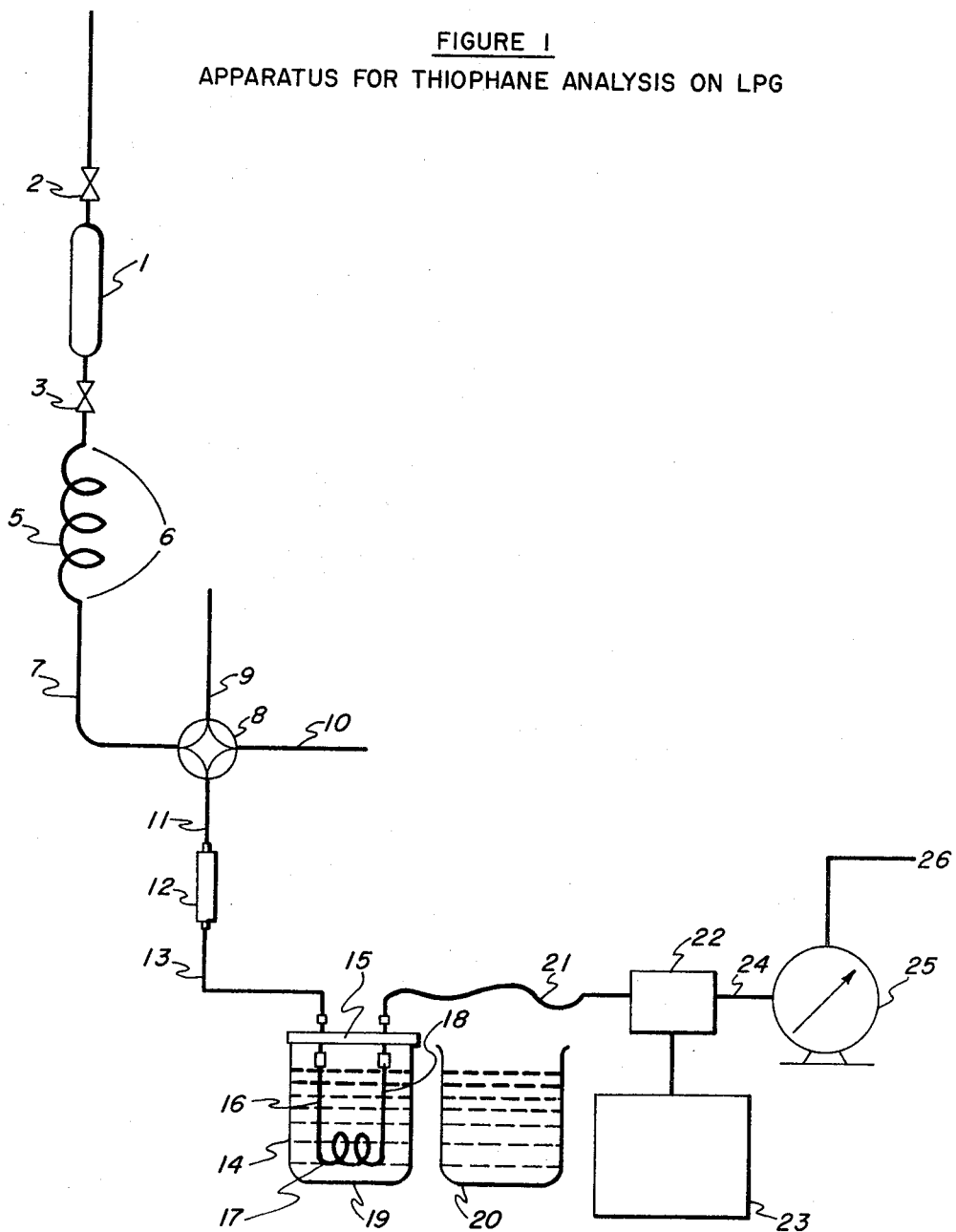
FIG. 1 is a schematic representation of the apparatus of the instant invention.
Figure 2:
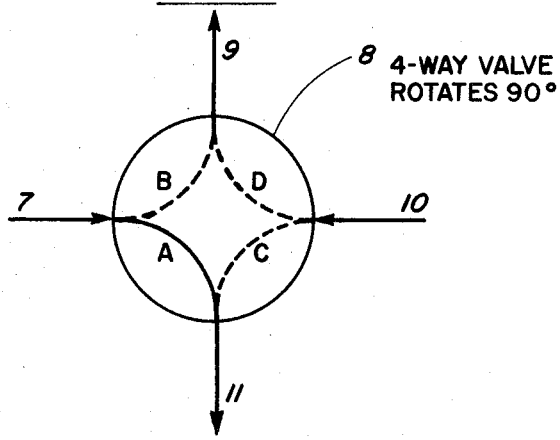
FIG. 2 is a schematic representation of a portion of the apparatus shown in FIG. 1.

Referring to FIG. 1, an apparatus for detecting trace impurities in petroleum gas streams and utilizing a piezoelectric detector crystal includes a bottle 1, designed to hold liquids under pressure. Bottle 1 is provided with valves 2 and 3. The bottle is adapted to receive a sample containing trace amounts of the impurity to be analyzed. The valve 3, at the bottom of bottle 1, is connected to one end of a coil 5. Coil 5 is made of stainless steel capillary tubing and has an inside diameter of about 0.01 inch and a length of about 6 feet. Electrical wires indicated by the reference numeral 6, are connected to coil 5. To vaporize the liquid as it flows through coil 5, the opposite ends of wires 6 are connected to a transformer (not shown) yielding 25 watts of power and 5 amperes of current. Coil 5 is in communication with line 7, which in turn, connects to a four-way valve, indicated generally at 8. The four-way valve 8 is schematically represented in FIG. 2 and will be discussed in further detail hereinafter. As may be seen, in FIG. 1, valve 8 is adapted to receive flow both from the sample bottle 2, by way of line 7 and from a source of carrier gas by way of line 10. Valve 8 also has two outlets, one of which is in communication with a line 11 which leads to a sorption column 14. The second outlet of valve 8 is in communication with a line 9, which is a vent. Referring to FIG. 2, it will be observed that the openings are disposed at right angles with the inlet and the outlet openings disposed opposite each other, 180° apart. Hence, the stopcock is constructed so that flow moves at right angles through the valve, providing flow through one inlet and one outlet opening. This is illustrated by solid line (A) and dotted lines (B, C and D). These lines indicate all possible flow patterns through the valve 8. In all cases flow moves through the valve 8 at right angles. The direction of flow is denoted by the arrows. Hence, for example, if the valve was set as denoted by line (A) the flow would enter the valve through line 7 and leave from line 11.

Referring once again to FIG. 1, it is seen that a line 11 is in communication with a water trap 12. Trap 12 comprises a 9-inch column of ¼-inch stainless steel tube. This tube is packed with the sodium salt of a dehydrated sulfonated polystyrene which has been crosslinked with divinyl benzene (such a salt is available under the tradename dehydrated Dowex Resin 50 WX 8 manufactured by the Dow Chemical Company.

A line 13 is provided downstream of and in communication with the water trap 12. The sorbent column unit, indicated generally at 14, is in communication with line 13, disposed downstream of said line. This unit consists of a cover plate 15, an inlet tube 16, an outlet tube 18, and a column 17 in the form of a coil between inlet 16 and outlet tube 18. Coil 17 is made of stainless steel and has a linear length of about 6 feet and an inner diameter of approximately ¼-inch. It is provided with a liquid for preferentially sorbing the trace component of the gas stream. In a preferred embodiment the sorbent liquid is a high boiling point polar liquid or oxygenated hydrocarbon such as a high molecular weight polyalkyl ether or a polyalkyl glycol and mixtures thereof. In an even more preferred embodiment, coil 17 is provided with a liquid selected from the group consisting of polypropylene ether, polyethylene glycol and mixtures thereof.

Two reservoirs 19 and 20 are also provided for immersion of the sorbent column 14. Reservoir 19, whose temperature is kept in the range of −40° to 30° C. is the cold reservoir in which the column is first placed. Generally an ice bath at 0° C. is employed. The warm reservoir 20 has a temperature in the range of 50° to 150° C. Generally boiling water at 100° C. is used.

The outlet tube 18 of the sorption column unit 14 is in communication with a line 21, which communicates with the crystal piezoelectric detector 22. Crystal detector 22 is connected to an electric circuit by means of which a signal proportional to the composition and concentration of the gas flowing over the detector is obtained. The operation of the detector will be presently described. The signal generated by the piezoelectric crystal detector is recorded on an electrical strip chart recorder 23.

The gas stream after passing over the piezoelectric detector flows through a line 24 to a gas meter 25 wherein the volume of gas which has passed over the crystal is measured. Thereafter, the gases pass out of the apparatus through a suitable vent line 26. In a preferred embodiment a soap film meter measures the volume of gas passing over the crystal detector when high impurity concentration samples are run since then the sample size will be relatively small. The preferred embodiment in the case of a low concentration sample, necessitating a large volume sample, is a wet test meter.

Figure 3:
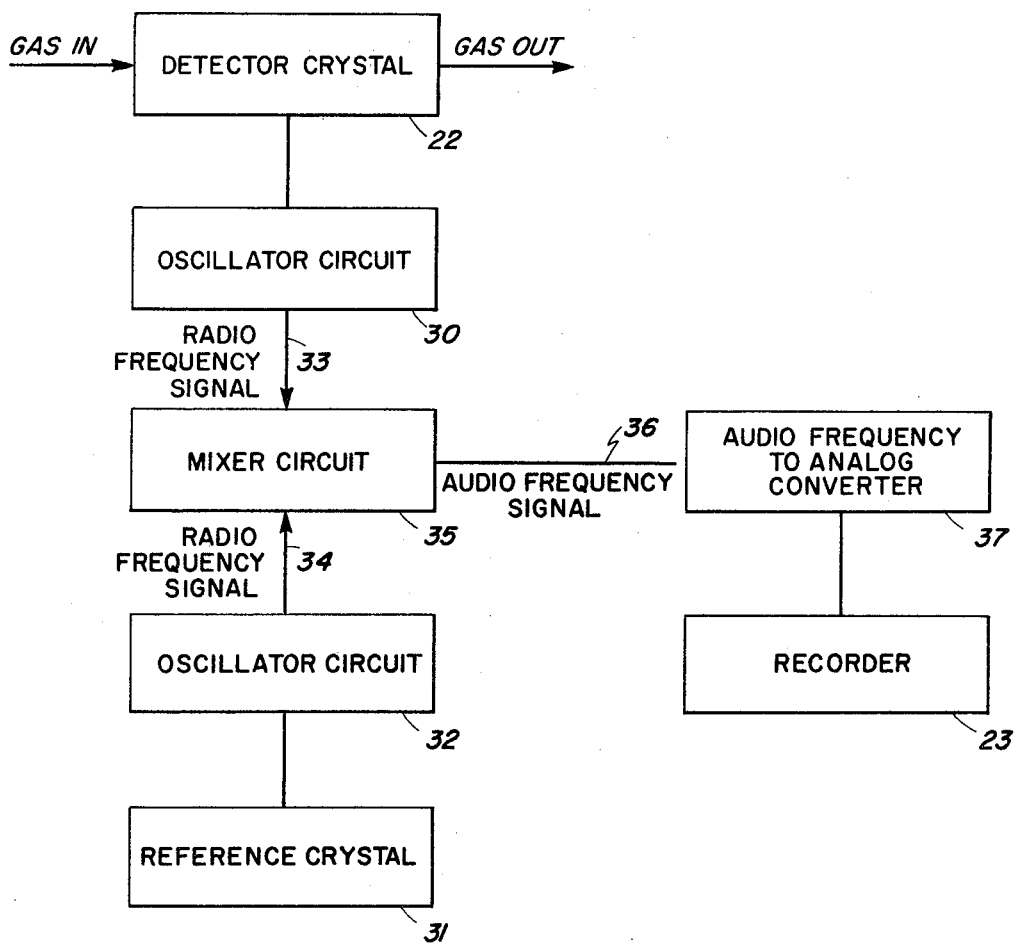
FIG. 3 is a block diagram of the electrical circuit wherein vibrational impulses from the piezoelectric device are transformed into electrical signals.

FIG. 3 schematically demonstrates the operation of the coated piezoelectric crystal detector. The coated piezoelectric detector 22 is electrically connected to an oscillator circuit 30 which causes the piezoelectric detector 22 to vibrate. At the other end of the circuit a reference crystal 31 is similarly vibrated by another duplicate oscillator circuit 32. The reference crystal 31 differs from the piezoelectric detector 22 only by the absence of the coating which will be described herein.

Both detector and reference oscillator circuits yield radio frequency signals denoted 33 and 34 respectively, which are fed into a mixer circuit 35. Prior to a determination the two signals are balanced so as to get a zero point. The mixer circuit subtracts the signals 33 and 34, producing an audio frequency signal 36 equal to the difference between the two radio frequency signals. The difference in these signals is the result of differences in vibrational frequency of detector and reference oscillator circuits which will be explained hereinafter. The audio frequency signal 36 is fed into an audio frequency to analog converter 37, which produces the signal recorded on the electrical strip chart recorder 23.

As the gas passes over the piezoelectric crystal detector, the fraction that is the subject of determination, (e.g., mercaptans in general and thiophane in particular) is selectively sorbed onto the coating of the detector crystal 22 thereby increasing the weight of this crystal and changing its vibrational frequency. This results in an inbalance between the reference and detector radio frequencies 33 and 34, which produces a resultant audio frequency 36 out of the mixer 35 which is recorded as a peak on the electrical strip chart recorder 23 after being converted in the audio frequency to analog converter 37. It will be appreciated by one skilled in the art that the recorded signal is proportional to concentration.

In operation, the apparatus is initially purged with carrier gas, for about 30 minutes. The carrier gas flows at the rate of approximately 30 milliliters per minute. The carrier gas can be any inert gas such as nitrogen, helium, argon, light end saturated hydrocarbons or carbon dioxide. Prior to a determination of the concentration of a sample containing an unknown concentration of an impurity, a standardized blend of a known concentration of the impurity is first tested. An example is the determination of thiopane concentration. Prior to running an unknown sample, a standardized blend of about 50 parts per million by weight of thiophane in propane is used to derive a standard peak. The method of operation for the evolution of a standard peak by means of a standard blend is exactly the same as the procedure for determination of a sample of unknown thiophane concentration. Hence, the description of the method of operation for the standard sample, which is described below is applicable for all samples of unknown thiophene concentration.

A liquid sample under pressure, in the bottle 1, is introduced into the apparatus by means of valve 3, at the bottom of the bottle 1. The liquidized sample is immediately vaporized in the capillary coil 5, which is maintained at a temperature in the range of 75° to 175° C. by means of a resistance heater 6.

The gaseous sample now enters the four-way valve 8 through line 7. The valve is set so that the gas flows from line 7 to line 11 and then into the water trap 12, wherein any water initially present in the gas sample is removed. Without this step, upon heating of the sorbent, water would elute along with the impurity being measured. The piezoelectric detector is sensitive to water so that an undesirable peak would be recorded.

The now dehydrated sample enters the sorption column 14, by means of line 13. The sorption column 14, has during the procedure described above been immersed in the cold reservoir 19. The thiophane constituent of the gas sample is selectively sorbed in the sorbent in the cold reservoir. The remainder of the gas is unaffected and flows through outlet tube 18, and through line 21, to the crystal detector 22.

The coating on the piezoelectric crystal detector of the present invention as stated previously, is relatively insensitive to hydrocarbon gas streams, while being very sensitive to thiophane in particular and mercaptans in general. Therefore, the petroleum gas flowing over the crystal results in a relatively straight line trace on the recorder which denotes flow but is not sensitive enough to distinguish the various constituents of the gas, so that no peaks result. Hence, oftentimes the determination is made without the recorder running while the sorption column is in the cold reservoir.

The sorption column 14 remains in the cold bath 19 until about 1 liter of gas passes through the crystal detector 22. This gas volume measurement is made by gas meter 25. After approximately 1 liter of gas has flowed through the gas meter 25, and out of the apparatus through vent 26, four-way valve 8 is adjusted to cut off flow from line 7 and open line 10 to admit carrier gas. The sorption column 14, is left in the cold bath 19, for about 2 minutes or until the characteristic hydrocarbon straight straight line trace subsides. The gas column 14 is then taken out of the cold bath 19, and placed in the hot bath 20.

The thiophane, which was sorbed in the column 14, elutes about 2 minutes after the column 14 is placed in the hot bath 20. At this time, the thiophane characteristic peak appears on the recording trace. The peak height is proportional to the concentration of thiophane. Valve 8 remains open to line 10, so that carrier gas remains flowing for a few minutes thereafter, while the column 14 remains in the hot bath. Thereafter, the column 14 is replaced in the cold bath 19, and the apparatus is ready for a new sample.

Figure 6:
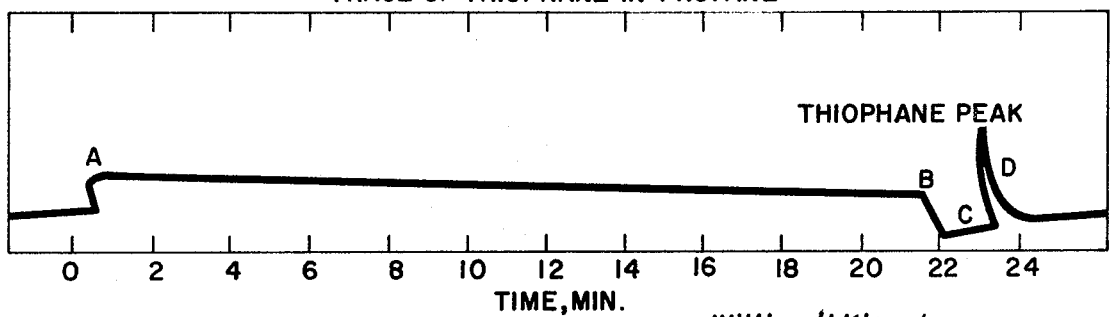
FIG. 6 is a trace of a typical sample of thiophane in a solution containing propane as solvent.

A typical trace of a run for the determination of the concentration of thiophane in propane appears in FIG. 6. The figure is conveniently segmented into four time periods. In the time periods denoted in FIG. 6 as A, the sorbent column is in the cold reservoir, prior to the start of the run. A small peak appears at about one-half minute after the sample is fed into the apparatus, at the beginning of the period denoted by B. This is the response of the piezoelectric detector to propane. This peak remains relatively stable for the total period denoted by B, since for this period the sorbent column remains in the cold bath wherein thiophane is sorbed onto the sorbent. Hence, only propane passes over the piezoelectric detector. In the period denoted on FIG. 6 as C, the sample bottle is closed and the sorbent column is placed in the warm bath. At the same time, helium carrier gas is introduced into the system. Hence, the sudden drop in the trace height. The piezoelectric detector is less sensitive to helium than it is to propane resulting in the rapid drop off. However, after about two minutes the thiophane which elutes off the sorbent at the higher bath temperature, passes over the piezoelectric detector resulting in the peak as seen in the period denoted at D.

As will be appreciated by those skilled in the art, a key requirement for an apparatus of the type herein described is that reproducible and consistent results be obtained. This is accomplished by the use of the piezoelectric crystal detector of the instant invention. Such a detector, of course, includes a responsive material and a substrate.

A "responsive material" is any material which exhibit piezoelectric properties, i.e., a material which if subjected to mechanical pressure will develop electrical potential and vice versa. Several such materials are known, for example, crystals such as Quartz, tourmaline, Rochelle Salts and other materials such as barium titanate. Quartz is the particular crystal most often employed in electrical application and it is the preferred responsive material of this invention.

The term "substrate" refers to any thin film or coating deposited on the responsive material.

In accordance with the present invention, the substrate must be one which is selective toward the specific component of the gaseous composition which is to be detected and measured. In a preferred embodiment of this invention, the substrate is a porous material of high surface area ranging from about 135 to about 430 square meters per gram. Silica is the preferred porous material and a silica surface area of about 330 to about 430 square meters per gram is even more preferred.

The average particle size of substrate employed in this invention ranges from about 7 to about 22 millimicrons and preferably from about 7 to about 9 millimicrons.

The preparation of such high surface area materials is well known. For example, colloidal dispersions of silica having the preceding properties are readily prepared by acidifying sodium silicate solutions. For example, an aqueous solution of sodium silicate containing 30 percent silica expressed as $SiO_2$ can be acidified with mineral acid to a pH of from about 4 to about 10. Alternatively, a silicate solution containing 3 percent silica expressed as $SiO_2$ can be passed through an appropriate ion exchange column in the acid form. In either instance, colloidal dispersions of silica suitable in practice of the present invention are obtained.

To produce a suitable detector, a responsive material such as a quartz crystal is coated with a specific substrate such as colloidal dispersion of a porous media having a high ratio of surface area per unit volume. Coating is accomplished by using a small brush to paint or spread the colloidal dispersion onto the crystal. The coating resulting therefrom, after drying and washing with water, is tightly bound, resulting in a highly active detector. As stated previously, silica gel spheres have been found to be particularly effective for this application and, hence, are the preferred substrate.

In order to attain a stable output signal the surface must be passivated or preconditioned. This is accomplished by exposing the freshly coated detector to a high boiling point polar liquid such as high molecular weight polyalkyl ethers, polyalkyl glycols and mixtures thereof. Exposure of the detector is continued for a time sufficient to render the sensitivity constant.

Figure 4:
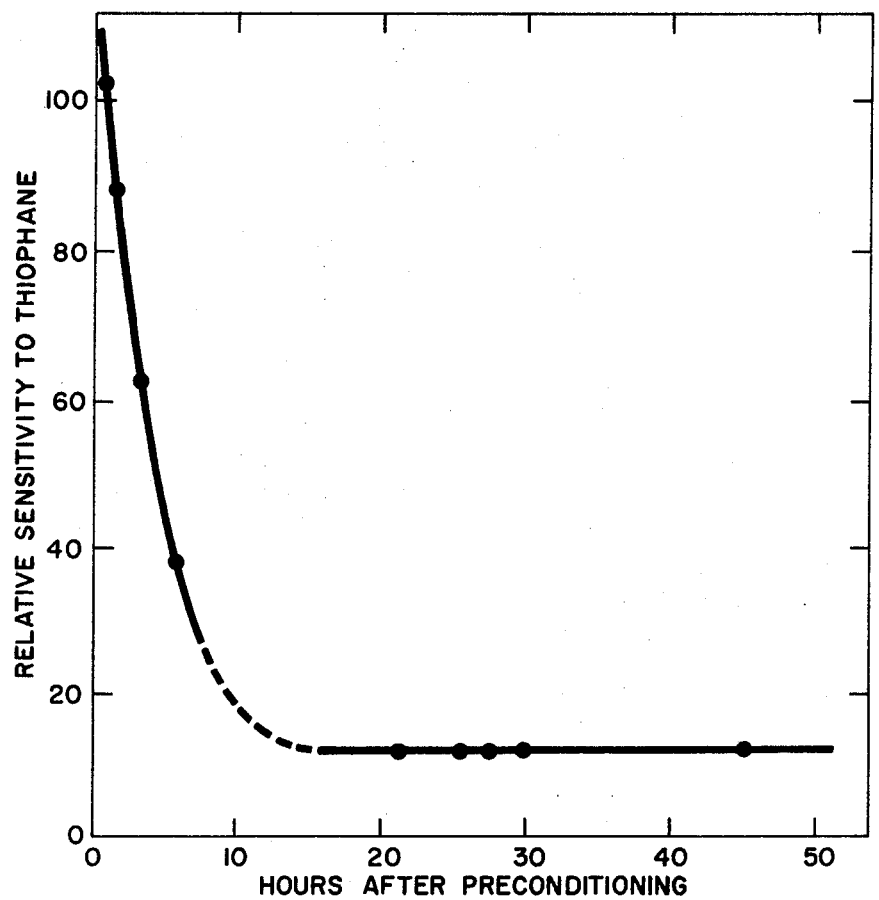
FIG. 4 is a plot of sensitivity of the piezoelectric detector as a function of time after deactivation of the detector.

In a particularly preferred embodiment of the present invention sorbent column 14 is charged with the high boiling liquid previously described. Then the column is heated to about 100° C. while an inert or carrier gas is passed through the column. The bleed from column 14 is passed over the freshly coated detector. After 15 hours of exposure to this passivating agent a constant sensitivity of the crystal detector 22 results. The crystal detector 22, when stabilized, yields a constant output signal for at least 6 mOnths. This is demonstrated in FIG. 4 which is a plot of relative sensitivity to thiophane as a function of time after stabilization of the detector. FIG. 4 indicates the relative sensitivity to thiophane of the piezoelectric detector after deactivation. As can be seen therein, after about 15 hours the sensitivity curve is stabilized. Although this curve demonstrates stability for only 50 hours, other experimental results, not shown herein, indicate this sensitivity does not change for 6 months.

The preconditioning liquid or high boiling oxygenated hydrocarbons interact with the highly sensitive substrate thereby stabilizing the output signal of the detector while decreasing the sensitivity of the detector to about 12 percent. Thus, the detector remains sensitive and selective while still affording constant and reproducible results.

Figure 5:
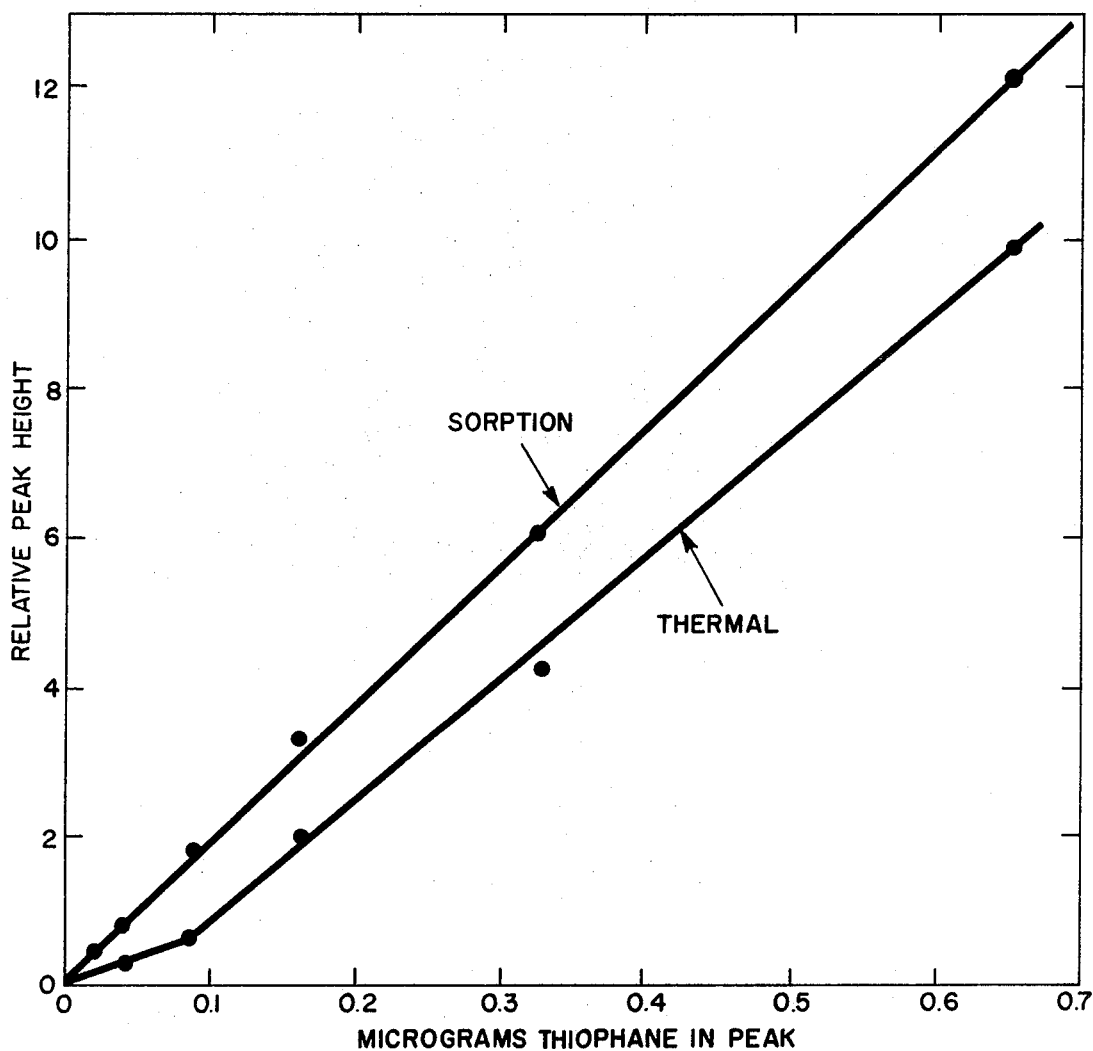
FIG. 5 is a plot of relative peak height as a function of thiophane concentration, comparing the results obtained using the method of the instant invention with those obtained using a prior art method employing a thermal conductivity detector.

Returning to FIG. 1, the sorption detector 22, used in the apparatus of the instant invention, has the additional characteristic of producing peaks on the gas strip charge recorder 23, which are a linear function of impurity concentration even at very low impurity concentrations. In comparison, the thermal conductivity detector, of the prior art, produces impurity peaks which are not linear with impurity concentration at very low concentrations. An excellent example is thiophane, wherein concentrations of 0.1 micrograms per cubic centimeter of thiophane in the peak do not yield peaks which are linear with thiophane concentrations, when the thermal conductivity detector is employed, whereas the apparatus of the instant invention does yield linear results. FIG. 5 demonstrates this characteristic. FIG. 5 is a plot comparing relative peak heights as a function of micrograms thiophane in the peak. It is seen that the crystal detector of the current invention increases the range of linearity below 0.1 micrograms thiophane, the minimum concentration for which the thermal conductivity detector of the prior art yields linear relationship between peak height and thiophane concentration.

EXAMPLE

From experiments run with the present invention, it has been found that the repeatability of the thiophane determination is within the following range:

| Level | Repeatability |
| --- | --- |
| 20 parts per million by volume or higher | 3% |
| 0.1 to 10 parts per million | 10% |
| 20 parts per billion or lower | 20% |

Figure 7:
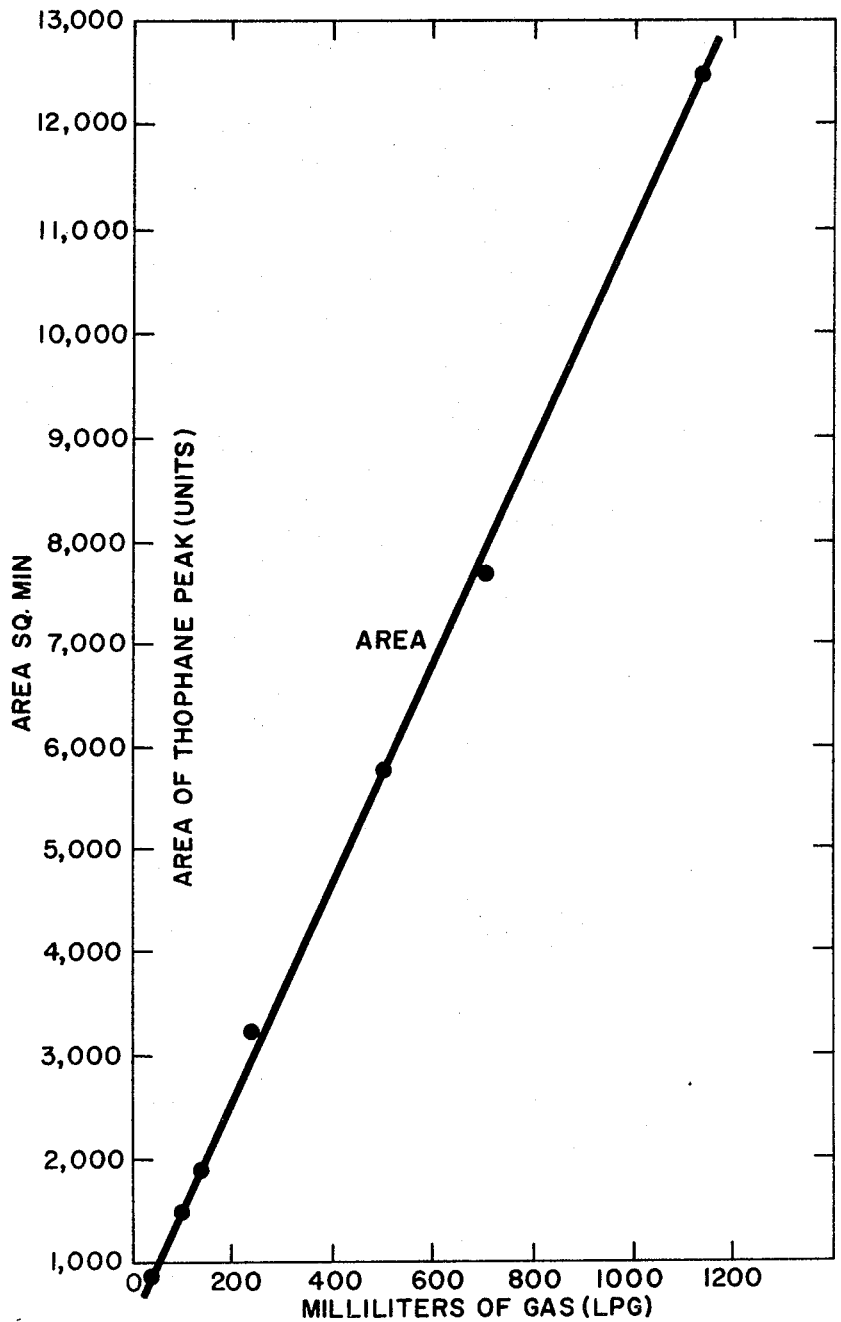
FIG. 7 is a plot of the area of the thiophane peak as a function of sample volume.

Experimental results verify the linear response for impurities over a wide range of concentration. This is illustrated in FIG. 7, wherein a liquefied petroleum gas sample, containing a fixed amount of impurity (24 parts per million of thiophane) was varied in volume from 100 to 1,150 milliliters. In FIg. 7, area of the thiophane peak is plotted as a function of volume of LPG gas. The calibration data obtained in this experiment upon which this curve is based is shown in Table I below. As can be seen in FIG. 7, the area of the peak is linear with the linearly increasing amount of thiophane contained in the sample.

TABLE I

| Charge, ml | mm W/2 | mm H | Thiophane, Peak Area |
| --- | --- | --- | --- |
| 50 | 34 | 18 | 600 |
| 110 | 34 | 45 | 1520 |
| 150 | 34 | 55 | 1880 |
| 250 | 34 | 95 | 3210 |

| | | | |
|---|---|---|---|
| 500 | 34 | 168 | 5700 |
| 700 | 34 | 226 | 7680 |
| 1150 | 54 | 232 | 12510 |

What is claimed is:

1. A method of stabilizing the output signal of a silica coated crystal detector comprising contacting said detector with a sufficient amount of a high boiling point liquid selected from the group consisting of polyalkyl ethers, polyalkyl glycols and mixtures thereof whereby the sensitivity of the detector is rendered constant.

2. The method of claim 1 wherein said detector is contacted with vapors of said high boiling point liquid carried in a gas stream.

3. The method of claim 2 wherein said gas stream is composed essentially of an inert gas.

4. The method of claim 1 wherein said high boiling point liquid is polypropylene ether.

5. The method of claim 1 wherein said high boiling point liquid is a polyethylene glycol.

6. A method of preconditioning a silica coated piezoelectric detector comprising passing a gas stream through a high boiling polar liquid selected from the group consisting of polyalkyl ethers, polyalkyl glycols and mixtures thereof and then passing said gas stream in contact with said detector for a time sufficient to stabilize the output signal of said detector whereby the sensitivity of the detector is rendered constant.

7. The method of claim 6 wherein said polar liquid is at about 100°C.

8. A method of preparing a piezoelectric detector comprising:
coating a piezoelectric crystal with a silica material having a high ratio of surface area to unit volume; and
exposing said coated crystal to a high boiling point polar liquid selected from the group consisting of polyalkyl ethers, polyalkyl glycols and mixtures thereof.

9. The method of claim 8 wherein said silica material has an average surface area of from about 135 to about 430 square meters per gram.

10. The method of claim 8 wherein said silica has an average surface area of from about 330 to about 430 square meters per gram.

11. A method of stabilizing the output signal of a highly active silica coated piezoelectric crystal comprising:
exposing said silica coated crystal to a high boiling oxygenated hydrocarbon selected from the group consisting of poly-alkyl ethers, polyalkyl glycols and mixtures thereof.

* * * * *